Figure 1:
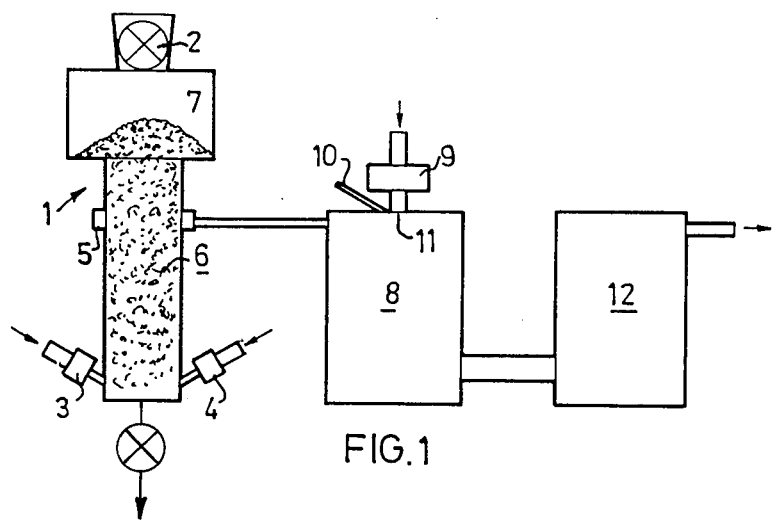

United States Patent [19]

Santén et al.

[11] Patent Number: 4,718,362
[45] Date of Patent: Jan. 12, 1988

[54] WASTE DESTRUCTION

[75] Inventors: Sven Santén, Hofors; Sven Eriksson; Lars Bentell, both of Falun; Håkan Johansson, Sandviken, all of Sweden

[73] Assignee: SKF Steel Engineering AB, Hofors, Sweden

[21] Appl. No.: 849,656

[22] Filed: Apr. 9, 1986

[30] Foreign Application Priority Data

May 3, 1985 [SE] Sweden .................... 8502165

[51] Int. Cl.$^4$ .................... F23G 5/12
[52] U.S. Cl. .................... 110/346; 48/76; 48/203; 110/229
[58] Field of Search .................... 110/346, 229; 48/76, 48/203

[56] References Cited

U.S. PATENT DOCUMENTS 4,479,443 10/1984 Faldt et al. .................... 110/238 X
4,485,745 12/1984 Bracker et al. .................... 110/229
4,561,363 12/1985 Mallek .

FOREIGN PATENT DOCUMENTS 82002288 1/1982 Sweden .
82012634 3/1982 Sweden .
484163 7/1984 Sweden .
371453 10/1985 Sweden .
2003589 3/1979 United Kingdom .................... 110/229

Primary Examiner—Edward G. Favors
Attorney, Agent, or Firm—Armstrong, Nikaido, Marmelstein & Kubovcik

[57] ABSTRACT

The present invention relates to a method of destroying waste to form a leach-proof slag and a gas containing only $H_2$ and CO as combustible constituents. The method comprises the steps of: (a) supplying waste material at the top of a shaft furnace while simultaneously supplying energy in the form of hot oxidizing gas at the bottom of the shaft furnace, (b) discharging liquid slag from the bottom of the furnace shaft and withdrawing the gas generated, at the top of the furnace shaft, and (c) supplying the gas generated, to a subsequent reaction chamber while simultaneously supplying energy in the form of a hot gas.

19 Claims, 2 Drawing Figures

WASTE DESTRUCTION

The present invention relates to a method of destroying household and industrial waste to form a leach-proof slag and a gas in which the combustible constituents consist essentially only of $H_2$ and CO.

Nowadays such waste, besides by dumping, is disposed of almost exclusively by complete combustion. A relatively low temperature is obtained in the combustion step due to low thermal value, high water content and uneven composition. This means that combustion is incomplete and that heavier hydrocarbons are formed. Incombustible constituents are discharged as ash in which the constituents are dissolved or not bound at all, which gives rise to dumping problems such as dust and harmful substances being easily leached out of the ash.

The object of the present invention is to effect a process which eliminates the above-mentioned drawbacks and offers a pro-environmental process, the residual product being substantially free from any unbound pollutants and a combustible gas being produced in which the combustible constituents are essentially only $H_2$ and CO.

This is achieved by the method according to the present invention comprising the steps of:

(a) supplying the waste material at the top of a shaft furnace while simultaneously supplying energy in the form of hot oxidizing gas at the bottom of the shaft furnace, (b) discharging liquid slag from the bottom of the furnace shaft and withdrawing the gas generated at the top of the furnace shaft, and (c) supplying the gas generated, to a subsequent reaction chamber while simultaneously supplying energy in the form of a hot gas.

The gas generated in the furnace shaft contains pollutants such as heavy hydrocarbons. The supply of energy to the subsequent reaction chamber and the presence of water which has vaporized from the waste material causes the hydrocarbons to be thermally cracked to form CO and $H_2$.

According to one embodiment of the invention oxidizing gas, preferably air, heated in a plasma generator, is used to supply energy to the bottom of the shaft furnace. The temperature can thus be accurately and rapidly controlled to the desired level following variations in the composition of the waste.

According to a further embodiment of the invention the hot gas supplied to the subsequent reaction chamber is heated in a plasma generator. The use of a plasma generator to heat the gas gives it extremely high energy density and the volume of gas required for the desired amount of energy is therefore relatively small.

According to a further embodiment of the invention, finely pulverized coke and/or water vapour is injected into the subsequent reaction chamber to compensate a too low content of C and/or $H_2O$.

According to a further embodiment of the invention, the gas is also subjected to a catalytic cleaning step to remove any remnants of heavy hydrocarbons. The gas is conducted through a chamber containing a catalyst. The catalyst is preferably lime or dolomite, but other catalysts are also feasible such as nickel. The process is preferably controlled so that the temperature of the gas leaving the shaft furnace is at most 800° C. and that of the gas mixture leaving the subsequent reaction chamber is more than 1000° C., preferably approximately 1200° C. The high temperature in the subsequent reaction chamber produces substantially complete thermal disintegration of heavy hydrocarbons present in the gas.

A temperature exceeding the melting point of the slag is maintained in the lower part of the shaft. When the slag solidifies incombustible constituents become glass-encased, thus enabling the slag to be safely dumped.

According to yet another embodiment of the invention chlorine compounds are removed from the gas by conducting it after cooling through a chamber containing quicklime. The quicklime is preferably taken from a previous catalytic purifying step in which limestone/dolomite has been calcinated due to the high initial temperature of the gas.

Figure 2:
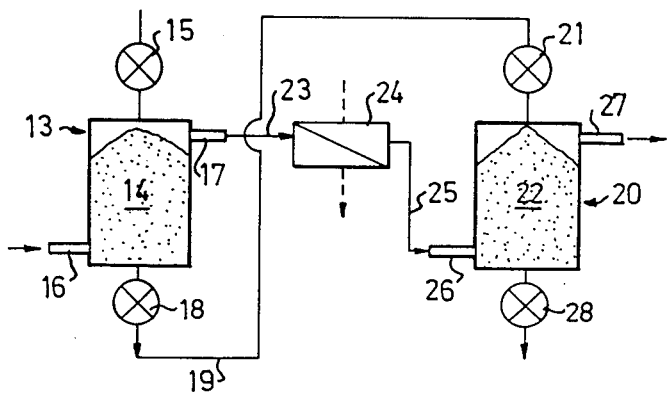

Other advantages and features of the invention will be revealed in the following detailed description with reference to the accompanying drawings in which FIG. 1 shows schematically a view of a plant for performing the process according to the invention, and FIG. 2 shows a means for catalytic disintegration of heavy hydrocarbons and removal of chlorine compounds from the gas generated at pyrolysis of the waste.

The waste material is supplied through suitable sluice means 2, to a shaft furnace 1. Energy and oxidant are supplied at the bottom of the shaft furnace, by means of one or more arrangements for the supply of hot air in the embodiment shown. These arrangements may be plasma generators, for instance. The gas generated at pyrolysis is withdrawn through a bustle-pipe 5, arranged in the embodiment shown so that the gas is withdrawn below the surface 7 of the waste material 6 in the shaft furnace.

The gas thus generated is then conducted to a subsequent reaction chamber 8. Energy is supplied by means of a hot gas which in the preferred embodiment shown is heated in a plasma generator 9. All or a part of the gas may be passed through the plasma generator. Finely pulverized coke and/or water vapour may also be supplied if necessary, through lances 10 close to the inlet 11 for the gas heated by the plasma generator. Impurities, primarily in the form of heavy hydrocarbons, are thermally disintegrated in this reaction chamber.

After thermal disintegration the gas may be subjected to further cleaning in a means 12, indicated only schematically in the drawing, in the form of an empty chamber. Finely pulverized lime, for instance, may be injected in this chamber for catalytic disintegration of any heavy hydrocarbons remaining in the gas. Alternatively the gas may be conducted through a filler of lime in lump form, or some other catalyst for the disintegration process.

The gas may then be subjected to a chlorine purification step, described in more detail with reference to FIG. 2, and mercury be removed therefrom by condensing in a final step.

The gas-purifying equipment illustrated in FIG. 2 comprises a first shaft 13 containing a limestone and dolomite filler 14, supplied to the shaft through a sluice arrangement 15. The gas from the subsequent reaction chamber is supplied, possibly after heat-exchanging, through a gas inlet 16 at the bottom of the shaft and is withdrawn through outlet 17 at the top of the shaft after having passed through the filler. An out-feed table or the like is arranged at the bottom of the shaft for partially or wholly calcinated limestone being discharged through a gas-tight sluice arrangement 18.

The partially or wholly calcinated limestone is then carried on a conveyor belt or the like, indicated at 19 in the drawing, through a sluice arrangement 21 to form a filler 22 in a second shaft 20.

The gas emitted from the shaft 13 passes through a pipe 23 to a heat exchanger 24 and is heat-exchanged, preferably with air, enabling the physical heat from the gas to be utilized in earlier process steps or for other purposes. The gas is then conducted through the pipe 25 to a lower gas inlet 26 in the second shaft and passed through the filler 22 before being withdrawn through a gas outlet 27 located at the top of the shaft 20. An outfeed table or the like is arranged at the bottom of the shaft for discharging the product formed during the chlorine-purification process, via a gas-tight sluice arrangement 28.

The temperature of the gas introduced at the bottom of the first shaft shall exceed about 800° C. At these temperatures the limestone is calcinated and forms $CaO + CO_2$. The content of heavy hydrocarbons of the gas such as tars or the like, is cracked with the aid of $H_2O$ and/or $CO_2$ with CaO as catalyst. The grade of limestone should be selected according to the prevailing gas temperature since different types of limestone are calcinated at different temperatures. In this first step, thus, the lime acts only as catalyst in the cracking and is not affected by the chemical composition of the gas. The calcinated limestone discharged will still be in lump form, but considerably more porous.

When the tars or the heavy hydrocarbons have been removed the gas can be heat-exchanged without difficulty. This is preferably performed using cold air and the heated air can then be utilized in one or more of the preceding process steps.

The calcinated limestone is transported further to the second shaft to give a filler which is used to clean the gas from chlorine compounds and/or chlorine. CaO and 2HCl react here to form $CaCl_2$, for instance. This reaction should take place at a temperature below the melting point of $CaCl_2$ in the form in which it occurs.

The gas leaving is thus free from hydrocarbon compounds and chlorine compounds and, after possibly condensing out mercury, the only combustible constituents will be CO and $H_2$. After combustion the gas, now containing only $CO_2$, $H_2O$ and $N_2$, can be released to the atmosphere.

The method according to the present invention thus enables all the harmful, anti-environmental substances which normally cause great problems in conventional processes currently in use, to be taken care of and converted to harmless products, possibly even useful products such as $CaCl_2$.

We claim:

1. A method of destroying waste to form a leach-proof slag and a gas containing only $H_2$ and CO as combustible constituents, comprising the steps of:
   (a) supplying a waste material at the top of a shaft furnace while simultaneously supplying energy in the form of hot oxidizing gas at the bottom of the shaft furnace,
   (b) discharging liquid slag from the bottom of the furnace shaft and withdrawing the gas generated at the top of the furnace shaft, and
   (c) supplying the gas generated to a subsequent reaction chamber, while simultaneously supplying energy in the form of a hot gas heated by means of a plasma generator.

2. A method according to claim 1, wherein the hot gas supplied to the subsequent reaction chamber consists of air, recirculated gas or nitrogen gas.

3. A method according to claim 1, wherein water apour is injected into the subsequent reaction chamber.

4. A method according to claim 1, wherein finely distributed coke is injected into the subsequent reaction chamber.

5. A method of destroying waste to form a leach-proof slag and a gas containing only $H_2$ and CO as combustible constituents, comprising the steps of:
   (a) supplying a waste material at the top of a shaft furnace while simultaneously supplying energy in the form of a hot oxidizing gas at the bottom of the shaft furnace, the hot oxidizing gas supplied to the bottom of the shaft furnace having been heated in a plasma generator,
   (b) discharging liquid slag from the bottom of the furnace shaft and withdrawing the gas generated at the top of the furnace shaft, and
   (c) supplying the gas generated to a subsequent reaction chamber, while simultaneously supplying energy in the form of a hot gas heated by means of a plasma generator.

6. A method according to claims 1, wherein the hot gas supplied to the bottom of the shaft consists of air.

7. A method according to claims 1, wherein the gas formed in step (c) is subjected to catalytic cleaning in a further step.

8. A method according to claim 7, wherein the gas is conducted through a filler consisting of lime in lump form.

9. A method according to claim 1, wherein pulverized lime is injected into the gas.

10. A method according to claims 1, wherein any chlorine impurities present in the gas are cracked by allowing the gas to pass through a chamber containing a filler of quicklime.

11. A method according to claims 10 wherein quicklime produced by heating lime to clacining temperatures using gas from said subsequent reaction chamber is utilized for the cracking process.

12. A method according to claims 1, wherein the process is controlled so that the temperature in the gas leaving the shaft furnace is at most 800° C.

13. A method according to claim 5, wherein the quantity of energy supplied to the subsequent chamber is controlled so that the temperature of the gas mixture generated in the subsequent reaction chamber is above about 1000° C.

14. A method according to claim 5, wherein the gas formed in step (c) is subjected to catalytic cleaning in a further step.

15. A method according to claim 14, wherein the gas is conducted through a filler consisting of lime in lump form.

16. A method according to claim 7, wherein pulverized lime is injected into the gas.

17. A method according to claim 16, wherein the gas contains chlorine impurities and said impurities are cracked by allowing the gas to pass through a chamber containing a filler of quicklime.

18. A method according to claim 17, wherein quicklime produced by heating lime to calicining temperatures using gas from said subsequent reaction chamber.

19. A method according to claim 18, wherein the process is controlled so that the temperature in the gas leaving the shaft furnace is no greater than 800° C.

* * * * *